Patented Oct. 30, 1951

2,573,639

UNITED STATES PATENT OFFICE 2,573,639

MANUFACTURE OF POROUS ARTICLES FROM TRIFLUOROCHLOROETHYLENE POLYMER

Myron A. Coler, New York, N. Y., assignor to the United States of America as represented by the U. S. Atomic Energy Commission No Drawing. Application December 2, 1949,
Serial No. 130,865

8 Claims. (Cl. 18—47.5)

This invention relates to a process for preparing porous articles from polytrifluorochloroethylene plastic polymer and more particularly is concerned with a process for producing porous filters from this polymer.

The preparation of plastic polymers of trifluorochloroethylene and the properties of such polymers are described in the copending applications of William T. Miller et al., Serial Number 773,292, filed September 10, 1947, and of William T. Miller, Serial Number 730,176, filed February 21, 1947. As described in those applications the process of preparation involves the polymerization of the monomer trifluorochloroethylene at a temperature generally below 0° C. in a bomb in the presence of a small amount of bis-trichloroacetyl peroxide. Following the polymerization, the unreacted monomer is removed by evaporation from the solid polymer. The solid polymer can be molded to form a relative dense, impermeable article by the use of sufficiently high temperature and pressure applied simultaneously on the comminuted polymerization product. The properties of the polymer are in general those of a thermoplastic.

While this polymer has many intrinsically valuable properties, e. g. chemical and thermal resistance, which would be equally valuable in porous form, so far as is known, no porous, permeable articles have been produced from this polymer prior to this time.

One of the objects of this invention is to provide a method of preparing porous, permeable articles from the plastic polymer of trifluorochloroethylene. Another object of the invention is to provide a process of preparing a filtration medium having an extremely high corrosion resistance and having any desired degree of permeability. Other objects will appear in the description following.

Generally speaking, the present invention comprises the steps of molding a quantity of comminuted polytrifluorochloroethylene plastic polymer at about room temperature and thereafter sintering the molded mass at a temperature of less than 250° C. Under these conditions and under variations within the scope of these limitations a porous, highly flexible article is prepared which is mechanically stable and may have any desired permeability within a large range.

The plastic polymer as it is formed in the polymerization process has a relatively low bulk density compared with the hot-molded material. The reason for this is apparently that minute pores are formed in the material on evaporation of the unreacted monomer following the polymerization. However, it is emphasized at the outset that such material while porous is substantially impermeable and therefore not useful with respect to its porous properties. The material as polymerized is in the form of a block generally having the shape of the polymerization vessel and is comminuted prior to its use either for hot-molding purposes or for the purposes of the present process. Such material even after comminution to a very fine powder still retains its microporosity in each particle. In preparing porous articles, for example for use as filter media, these micro-pores often operate as a disadvantage since they are for the most part "blind," that is, they do not extend even through the finely divided particles of the comminuted polymer. The disadvantage inherent in such blind pores is that they tend to trap material in them, thus making the porous articles difficult to clean.

Accordingly, my preferred process is to compact the finely divided polymerization product in a mold or by other means in order to collapse these very fine micro-pores and thereafter to comminute the compacted powder prior to cold-molding at about room temperature. Comminuting at this point is required only to break up or deflocculate the compressed powder, and is desirably carried out by grinding by attrition using little force. The size of the powder selected after this grinding determines to a large extent the permeability of the finished porous article, other conditions being equal. The effect of this compacting step is to increase the bulk density of the powder. It is preferred to carry out the compacting of the powder at about room temperature and to employ pressures in the range of 500 to 10,000 pounds per square inch. In some cases the micro-porosity of the polymer may not be objectionable in the finished article, for example where cleaning is not required or where the material passing through the filter would not tend to enter the micro-pores because it does not wet the polymer. In such cases the compacting of the powder may be omitted. Details of my preferred process will be described hereinafter.

The particle size of the powder used in the cold-molding step forming a part of my invention will determine to a large extent the pore size of the finished article. Accordingly, it is desirable to employ as nearly uniform a particle size as possible and, in general, the particle size should be smaller than about 30 mesh and larger than about 300 mesh. The particles may be classified by sieving or by air classification or other means. When an extremely narrow range of particle size is desired, sedimentation from a liquid medium which wets the powder and which is volatile at a relatively low temperature can be used as will be further described hereinafter.

The sintering step, after removal of the cold-molded mass of powder from the mold, should be carried out at a temperature of less than 250° C. This temperature, however, will depend upon the molecular weight of the polymer. As a guide to the temperature which should be employed for any particular polymer, it may be said that the temperature should be about 50 to 100° C. below the temperature at which the polymer can be (or has been) molded to form an impermeable article. For example, a polymer of such molecular weight that a temperature of 300 to 310° C. is required before it can be molded under sufficiently high pressure would require in the present process a sintering temperature of around 210 to 250° C. for sintering. The heat should be applied uniformly to the pressed article and it is preferable to preheat the furnace to the desired temperature before placing the article in the furnace. Other methods of heating may also be employed such as circulating hot gas, etc. While being heated, the article is desirably supported on a thermally insulating material, e. g., on asbestos. Metallic supports tend to cause the surface of the heated article to glaze and become impermeable.

The following examples are presented to illustrate the method of this invention and it is not intended that they should be construed as a limitation of the invention. Unless otherwise specified in the examples and discussion following, the polymer referred to will be polytrifluorochloroethylene as it is produced by polymerization and comminution of the polymerization product. That is, it is material which has not been hot-molded.

*Example 1*

A sample of the polymer which had been hot-molded and thereafter comminuted to a particle size between 40 and 60 mesh was cold-molded at room temperature at a pressure of about 10,000 pounds per square inch to form a disk. The disk was placed in a furnace maintained at a temperature of 225° C. and after 30 minutes in the furnace the disk was removed and quenched in cool water. The disk was sufficiently porous to pass a man's breath. It was mechanically stable and resisted the impact caused by repeated falls on a concrete floor from six or seven feet. On heating such a disk in boiling water for 15 minutes the disk appeared to soften and could be deformed with moderate pressure but its resilience permitted it to resume its original shape when the pressure was released. On cooling, the disk returned to its original condition.

*Example 2*

A sample of polymer which had a particle size less than 100 mesh was placed in a mold at room temperature and the pressure on the mold increased to 2000 pounds per square inch and released immediately to form a disk. The disk had an extremely fine porosity after sintering at 225° C. for 8.5 minutes followed by quenching in water. It was quite tough, flexible and mechanically stable.

*Example 3*

Approximately 1.5 grams of the powdered polymer was placed in a mold at room temperature and compressed until the pressure reached 2000 pounds per square inch. The pressure was immediately released and the disk formed was removed from the mold. The particle size of the powder used was approximately between 140 and 100 mesh. The cold-molded disk was then placed in a furnace at 225° C. for 5 minutes and permitted to cool to room temperature. A mechanically stable, tough disk was formed with a relatively low permeability.

*Example 4*

A mixture was prepared from 0.75 gram of polymer, previously hot-molded and comminuted, whose mesh size was 20 to 40 and 0.75 gram of the as-polymerized polymer whose mesh size was 50 to 75. The two powders were carefully mixed and placed in a mold. The pressure on the mold was increased to 2000 pounds per square inch at room temperature and the pressure immediately released. The cold-molded disk was then placed in a sintering furnace and held at 225° C. for 5 minutes. The disk permitted the passage of nitrogen at a pressure of less than 4 pounds per square inch gage. It was used successfully to separate freshly precipitated barium sulphate from aqueous suspension.

*Example 5*

About 2 grams of the polymer was placed in a cylindrical mold having an area of 1 square centimeter. The pressure in the mold was increased to 2000 pounds per square inch at room temperature and immediately released. The resultant disk was heated at 225° C. for 5 minutes and subsequently permitted to cool in air. There was produced a strong, tough, flexible disk approximately .3 millimeters in thickness which was used successfully to filter freshly precipitated barium sulphate from an aqueous suspension.

*Example 6*

A sample of the polymer was compacted at a pressure of about 500 pounds per square inch and the resultant form was then powdered by attrition with a mortar and pestle. From this powder a disk one square centimeter in area was prepared by cold-molding the powder to 2000 pounds per square inch and thereafter heating for 5 minutes at 225° C. This filter was comparable in its properties to the standard medium porosity glass filter.

*Example 7*

A quantity of the polymer (30 to 50 mesh) was compacted at room temperature up to 2000 pounds per square inch. The resultant article was crumbled by hand and the pieces then ground by attrition in a mortar and pestle. The resultant particles were then classified by screening and the 40 to 60 mesh fraction retained. This fraction was then placed in a mold at room temperature and the pressure increased to 2000 pounds per square inch and immediately released. After heating at 225° C. for 5 minutes, a coarsely porous disk was produced. A similar disk prepared in the same manner except that the cold-molding before sintering was carried out at 8000 pounds per square inch resulted in a filter which was more finely porous.

Example 8

A sample of polymer was compacted at 2000 pounds per square inch and then ground by attrition with a mortar and pestle. The material was then screened and filter disks prepared with fractions obtained between 60- and 80-mesh screens, between 80- and 100-mesh screens and through a 100-mesh screen. Each of these fractions was used to prepare a filter disk by cold-molding to a pressure of 2000 pounds per square inch followed by sintering at 225° C. for 5 minutes and air cooling. Each of the filters prepared had very good mechanical properties and it was noted that the fineness of the porosity varied with the sieve size. The filter prepared from the powdered polymer less than 100 mesh was comparable to the standard fine porosity fritted glass filter while the 80 to 100 mesh powder yielded a filter having approximately the properties of the standard medium glass filter. The third disk was coarser than either of the other two.

Example 9

A sample of the polymer having an initial particle size below 140 mesh was compacted at 4000 pounds per square inch, ground by attrition in a mortar and pestle and re-screened to obtain the material passing through the 140 mesh screen. This powder was then subjected again to a pressure of 4000 pounds per square inch and again ground in a mortar and pestle. The resultant powder was classified according to size and the material passing through a 140 mesh screen used in preparing a series of filter disks. These disks were prepared by molding at room temperature at a pressure of 2000 pounds per square inch and thereafter heating the molded powder at 225° C. for 5 minutes. The initial diameter of the disks was 28.7 millimeters (the mold diameter) as cold-molded and the sintered disks had a diameter of 26.5 millimeters (on an average) and were one millimeter in thickness. These disks could be used to separate freshly precipitated barium sulphate by using a vacuum of 24" of mercury. It was noted that nitrogen could be passed through the filter at the pressure of about 2.5 p. s. i. gage whereas the fine glass filter required to separate barium sulphate permitted no nitrogen flow at 10 pounds gage pressure.

The following procedure represents a preferred method of preparing porous forms for use as filtration media: A sample of polymer having a particle size greater than 100 mesh is passed through a micro pulverizer using a 0.035-inch herringbone screen. The ground material is then classified according to particle size and only the −100 mesh material used. Powder larger than this size may be recycled. This powder, −100 mesh, is then compacted at 4000 pounds per square inch and the compacted material deflocculated by attrition, for example in a mortar and pestle. The resultant powder is again classified according to size with only the −80 mesh powder being retained. Powder of a larger particle size may be recycled. At this point the compacting of the powder at 4000 pounds per square inch and the defloculation by attrition are repeated and the resultant powder again classified according to size. Here the only powder retained is that passing through a 140 mesh sieve. This material is then suspended in a solvent which wets the powder and which is volatile at a temperature below the sintering temperature, for example isopropyl alcohol. A 5% suspension, by weight, is prepared and permitted to sediment under conditions permitting free settling. All but about 15% of the volume of the suspension is discarded or re-circulated as too fine after sedimentation for about 15 minutes in a 100 cubic centimeter graduate. The powder in the portion retained is then dried and thereafter compressed at room temperature in a mold at about 2000 pounds per square inch and the resulting form heated at a temperature between 215 and 230° C. until it is sintered. About 1 gram of powder distributed over one square inch requires some 4 to 5 minutes at 220° C., but the time should be determined empirically. The powder is permitted to cool in air and is preferably kept in a mold under very light pressure until it cools. This pressure should be no more than a few tenths of a pound per square inch.

Porous disks prepared by the preferred procedure were compared with a number of "fine" fritted glass filters selected at random. It was found that the flow rates through the fine fritted glass filters were about half as great under the same conditions as they were through the present disks. This was true even though the efficiency of clarification was approximately the same. It is surprising that porous filter disks prepared by my preferred method will permit the flow of nitrogen with a pressure drop of only 2 p. s. i. On the other hand, fine fritted glass filters comparable in clarification efficiency, required at least 10 p. s. i. for nitrogen flow therethrough under the same conditions. Even so-called medium sintered glass filters required at least 5–6 p. s. i. while having a much lower clarification efficiency.

The filters prepared by this method were noted to have extremely good resistance to corrosion by such diverse substances as 48% hydrogen fluoride at room temperature, boiling fuming nitric acid, 10% sodium hydroxide, concentrated ammonium hydroxide, etc., with no apparent effect on their filtration characteristics.

The mechanical properties of the porous articles prepared by the present process are particularly surprising in view of the normal brittleness of porous sintered materials. For example, they may be repeatedly thrown against a concrete floor without damage. They are very flexible and may be forcibly bent through an angle of almost 90° along a diameter without suffering any injury. Furthermore, their resistance to thermal shock is of a high order of excellence.

While the porous articles prepared according to the present method have been described with particular reference to their use as filtration media, it will be realized that they are not limited to such use. For example, they are useful in porous cells for electrolytic or osmotic processes or in storage batteries as separators.

In carrying out this method it is evident from the examples given above that a wide variety of properties may be incorporated in the articles produced, depending upon particle size of the powder used and its treatment prior to and after the steps of cold-molding and sintering. Whether the compacting and grinding steps before the final cold-molding are employed in the process will depend largely upon the intended use of the porous article. It is believed that the effect of these steps is to collapse the exceedingly fine pores contained in the material as it is polymerized so that wherever these fine pores may either be useful or of no consequence these steps may be omitted. When the compacting is regarded as necessary, it is preferable to carry it out in a series of repeated steps, although desirably not more than two cycles. The purpose of this is to preclude the formation of preferentially flattened particles. The compacting step may be used to some extent to control the final permeability of the porous article both by varying the degree of pressure applied and by selecting the particle size of the powders in the intermediate classification steps. In general, the smaller the pressure applied in this step, other conditions being equal, the finer the porosity that can be achieved. It is to be noted that molding of the polymerized polymer by the simultaneous application of pressure and heat at a relatively high temperature to form an impermeable, non-porous article and thereafter comminuting has the same effect on the micro-pores as the pre-compression steps although probably to a greater degree. It is preferred however to compact the particles at room temperature since comminution of the molded polymer is difficult.

The steps of cold-molding and of sintering are required to be carried out in order. The simultaneous application of heat and pressure, even though within the limits prescribed reduces the permeability of the articles to virtually zero.

Quenching of the polymer in a liquid medium after sintering has the effect of reducing the hardness as compared to air-cooled material. In relatively thick sections the surface layers only respond in this way to the quenching and the interior remains relatively hard because of poor heat transfer and concomitant slower cooling. In either case, such softening is advantageous where it is intended to clamp the filter disks between flanges for example. In that event, the need for gaskets is eliminated because the filter itself serves as an effective seal.

Since many embodiments might be made of the present invention and since many changes might be made in the embodiment described, it is to be understood that the foregoing description is to be interpreted as illustrative only and not in a limiting sense.

I claim:

1. The method of preparing a porous article of trifluorochloroethylene polymer comprising cold-molding a finely divided powder of said polymer at a pressure in excess of 500 pounds per square inch, removing the cold-molded polymer from the mold, thereafter sintering said molded powder by heating at an elevated temperature below 250° C. and within 50 to 100° below the temperature at which said polymer can be hot-molded, and cooling the sintered powder.

2. The method of preparing a porous article composed of trifluorochloroethylene polymer comprising cold-molding a finely divided powder of said polymer at a pressure in excess of 500 pounds per square inch, removing the cold-molded polymer from the mold, thereafter sintering the molded powder by heating at an elevated temperature below 250° C. and within 50 to 100° below the temperature at which said polymer can be hot-molded, and cooling the sintered powder by quenching in a liquid coolant.

3. The method of preparing a porous article composed of trifluorochloroethylene polymer comprising cold-molding a finely divided powder of said polymer at a pressure in excess of 500 pounds per square inch, removing the cold-molded polymer from the mold, thereafter sintering the molded powder by heating at an elevated temperature below 250° C. and within 50 to 100° below the temperature at which said polymer can be hot-molded, until it is heated throughout and cooling the sintered powder in air.

4. The method of preparing a porous article composed of trifluorochloroethylene polymer comprising cold-molding a finely divided powder of said polymer having a particle size in the range 30 to 300 mesh at a pressure in excess of 500 pounds per square inch, thereafter sintering the molded powder by heating at an elevated temperature below 250° C. and within 50 to 100° below the temperature at which said polymer can be hot-molded until it is heated throughout.

5. The method of preparing a porous article composed of trifluorochloroethylene polymer comprising compacting a finely divided powder of said polymer, comminuting the compacted powder, cold-molding the comminuted compacted powder at a pressure in the range of 500 to 10,000 pounds per square inch, removing the cold-molded polymer from the mold, thereafter sintering the molded powder by heating at an elevated temperature below 250° C. and within 50 to 100° below the temperature at which said polymer can be hot-molded until it is heated throughout and cooling the sintered powder.

6. The method of preparing a porous article composed of trifluorochloroethylene comprising compacting a finely divided powder of said polymer at room temperature by applying a pressure in the range of 500 to 10,000 pounds per square inch to a quantity of the powder, comminuting the compacted powder by attrition, cold-molding the comminuted compacted powder at a pressure in excess of 500 pounds per square inch, removing the cold-molded polymer from the mold, thereafter sintering the molded powder by heating at an elevated temperature below 250° C. and within 50 to 100° below the temperature at which said polymer can be hot-molded until it is heated throughout and cooling the sintered powder.

7. The method of preparing a porous article composed of trifluorochloroethylene polymer comprising compacting a finely divided powder of said polymer by applying a pressure of the order of 4000 pounds per square inch to a quantity of said powder, comminuting the compacted powder, repeating the steps of compacting and comminuting the powder, size classifying the comminuted compacted powder to obtain a desired particle size in the range 30 to 300 mesh, cold-molding the classified powder at a pressure in the range of 2000 to 5000 pounds per square inch, removing the cold-molded polymer from the mold, and thereafter sintering the molded powder by heating at an elevated temperature below 250° C. and within 50 to 100° below the temperature at which said polymer can be hot-molded until it is heated throughout.

8. The method of preparing a porous article from trifluorochloroethylene solid polymer comprising cold pressing a finely divided powder of said polymer by applying a pressure of the order of 4000 pounds per square inch, comminuting the compacted powder, repeating the steps of compacting and comminuting said powder, classifying the powder according to particle size by elutriation in a volatile solvent which wets the powder and removing the solvent, cold-molding the classified powder at a pressure in the range of 2000 to 5000 pounds per square inch, removing the cold-molded polymer from the mold and thereafter sintering the molded powder by heating at an elevated temperature below 250° C. and within 50 to 100° below the temperature at which said polymer can be hot-molded until it is heated throughout.

MYRON A. COLER.

REFERENCES CITED

The following references are of record in the file of this patent:

UNITED STATES PATENTS

| Number | Name | Date |
|---|---|---|
| 2,400,091 | Alfthan | May 14, 1946 |
| 2,400,099 | Brubaker | May 14, 1946 |

FOREIGN PATENTS

| Number | Country | Date |
|---|---|---|
| 578,168 | Great Britain | June 18, 1946 |

OTHER REFERENCES

"New High Temperature Thermoplastic," Modern Plastics, October 1948, pp. 168, 170, 172.